(12) United States Patent
Nishioka

(10) Patent No.: US 8,929,199 B2
(45) Date of Patent: Jan. 6, 2015

(54) PATH CONTROL DEVICE AND PATH CONTROL METHOD

(75) Inventor: Jun Nishioka, Tokyo (JP)

(73) Assignee: NEC Corporation, Tokyo (JP)

( * ) Notice: Subject to any disclaimer, the term of this patent is extended or adjusted under 35 U.S.C. 154(b) by 108 days.

(21) Appl. No.: 13/702,006

(22) PCT Filed: May 18, 2011

(86) PCT No.: PCT/JP2011/002757
§ 371 (c)(1),
(2), (4) Date: Dec. 4, 2012

(87) PCT Pub. No.: WO2011/158431
PCT Pub. Date: Dec. 22, 2011

(65) Prior Publication Data
US 2013/0083663 A1  Apr. 4, 2013

(30) Foreign Application Priority Data
Jun. 17, 2010  (JP) .................. 2010-138392

(51) Int. Cl.
H04L 1/00 (2006.01)
H04L 12/26 (2006.01)
H04W 4/00 (2009.01)
H04W 28/02 (2009.01)
H04W 40/02 (2009.01)
H04L 12/725 (2013.01)

(52) U.S. Cl.
CPC .......... H04W 28/0236 (2013.01); H04W 40/02 (2013.01); H04L 45/302 (2013.01)
USPC ............ 370/216; 370/235; 370/252; 370/332

(58) Field of Classification Search
USPC ............... 455/422.1, 423, 445; 709/223–229; 370/229–240, 252, 254, 332, 400–401, 370/216–228
See application file for complete search history.

(56) References Cited

U.S. PATENT DOCUMENTS 6,557,112 B1 * 4/2003 Shimada ................ 714/4.1
7,450,513 B2 * 11/2008 Okamura et al. ............. 370/235
(Continued)

FOREIGN PATENT DOCUMENTS

| EP | 1755238 A1 * | 2/2007 |
|---|---|---|
| EP | 2312887 A1 * | 4/2011 |
| JP | 2006505221 A | 2/2006 |
| JP | 2006238144 A | 9/2006 |
| WO | 2006001308 A1 | 1/2006 |
| WO | 2010016477 A1 | 2/2010 |

OTHER PUBLICATIONS

The international search report for PCT/JP2011/002757 mailed on Jun. 21, 2011.

(Continued)

*Primary Examiner* — Tri H Phan
(74) *Attorney, Agent, or Firm* — Sughrue Mion, PLLC (57) ABSTRACT

A path control device according to the present invention is a path control device 10 that sets a communication path using multiple radio links connecting multiple communication devices, the path control device including a link information management unit 11 that manages a first communication quality of each of the radio links; a traffic information management unit 12 that manages a state of traffic flowing through the radio links; and a path setting unit 13 that sets a path of a flow such that the first communication quality satisfies a second communication quality required by the flow flowing through the radio links, based on at least one of a change in the first communication quality and a change in the traffic state.

10 Claims, 8 Drawing Sheets

(56) References Cited

U.S. PATENT DOCUMENTS

| | | | |
|---|---|---|---|
| 7,468,953 B2* | 12/2008 | Maegawa et al. | 370/254 |
| 8,456,995 B2* | 6/2013 | Fujihira et al. | 370/235 |
| 8,687,498 B2* | 4/2014 | Imai | 370/238 |
| 2008/0101227 A1* | 5/2008 | Fujita et al. | 370/232 |
| 2011/0141897 A1 | 6/2011 | Nishioka et al. | |
| 2011/0223957 A1 | 9/2011 | Pietraski | |
| 2011/0286348 A1* | 11/2011 | Yamasaki et al. | 370/252 |
| 2012/0020222 A1* | 1/2012 | Nishioka | 370/235 |
| 2012/0243415 A1* | 9/2012 | Nishioka | 370/235.1 |

OTHER PUBLICATIONS

Jun Nishioka and Satoru Yamano "Routing Scheme for Bandwidth Guaranteed Traffic in AMC-enabled Wireless Mesh Network", IEICE vol. E92-D, No. 10, pp. 1934-1944, Oct. 2009.

Jun Nishioka, Satoru Yamano, "A Study on Routing over AMC-enabled FWA Mesh Network", IEICE Technical Report. NS, Network System, 108 (392), pp. 49 to 54 (Jan. 15, 2009).

* cited by examiner

| MODULATION METHOD | QPSK | 16QAM | 32QAM |
|---|---|---|---|
| ENSURED BANDWIDTH (Mbps) | 40 | 40 | 28 |
| STABILITY (%) | 100 | 80 | 50 |

PATH CONTROL DEVICE AND PATH CONTROL METHOD

TECHNICAL FIELD

The present invention relates to a path control device and a path control method, and more particularly, to a path control device that sets a path using radio links, and a path control method using the path control device.

BACKGROUND ART

Recent advances in informatization have led to an increase in demand for data communication traffic in data communication and the like. Accordingly, there are network-related needs for broader bandwidths and lower operation costs. Mobile telephone networks and the like utilize networks constructed by radio links including Fixed Broadband Wireless Access (FWA) which is based on a radio system utilizing a frequency such as a millimeter waveband that enables broadband transmission.

The communication quality of each radio link varies depending on a signal-to-noise ratio (SNR) of a received signal. In this regard, an adaptive modulation technique is employed to achieve a broader bandwidth of each radio link. The adaptive modulation technique is a technique that adaptively finds and uses a modulation mode with a highest transmission efficiency depending on the radio condition of each radio link. The use of the adaptive modulation technique enables optimum radio communication depending on the radio environment, which leads to an improvement in frequency efficiency.

If the modulation mode to be used in the future by each radio link can be predicted, the communication quality of traffic flowing through a network can be guaranteed. An example of a radio link using the adaptive modulation technology is disclosed in Published Japanese Translation of PCT International Publication for Patent Application, No. 2006-505221. As described in this literature, since a radio link using the adaptive modulation technology may have a certain degree of correlation with a past history, the modulation mode to be used by the radio link can be predicted (estimated).

Additionally, Non Patent Literature 1 discloses a path control method that ensures a communication quality, which is required by a flow, by using an index "stability" indicating how stably the bandwidth of each radio link can be used, due to the fact that the bandwidth of each radio link is changed by adaptive modulation.

CITATION LIST

Patent Literature

[Patent Literature 1] Published Japanese Translation of PCT International Publication for Patent Application, No. 2006-505221

Non Patent Literature

[Non Patent Literature 1] Jun Nishioka and Satoru Yamano "Routing Scheme for Bandwidth Guaranteed Traffic in AMC-enabled Wireless Mesh Network", IEICE Vol. E92-D, No. 10, pp. 1934-1944, October 2009

SUMMARY OF INVENTION

Technical Problem

In the case of using the techniques disclosed in Patent Literature 1 and Non Patent Literature 1, however, the following problem occurs. In the case of predicting a modulation mode to be used in the future by each radio link and setting a path using the stability that is predicted or estimated based on the predicted modulation mode, only the stability that can be found during path setting is used. Accordingly, if the stability of the bandwidth of each link varies due to environmental changes, a problem occurs in which it is difficult to add or delete a redundant path depending on the situation.

The present invention has been made to solve the above-mentioned problem, and it is an object of the present invention to provide a path control device and a path control method which are capable of adaptively coping with changes in a network, such as a change in traffic and a change in link quality.

Solution to Problem

A first exemplary aspect of the present invention is a path control device that sets a communication path using a plurality of radio links connecting a plurality of communication devices to each other, the path control device including: a link information management unit that manages a first communication quality of each of the plurality of radio links; a traffic information management unit that manages a state of traffic flowing through the plurality of radio links; and a path setting unit that sets the communication path of a flow such that the first communication quality satisfies a second communication quality required by the flow flowing through the radio links, based on at least one of a change in the first communication quality and a change in the state of the traffic.

A second exemplary aspect of the present invention is a path control method that sets a communication path using a plurality of radio links connecting a plurality of communication devices to each other, the path control method including the step of setting the communication path of a flow such that a first communication quality satisfies a second communication quality required by the flow flowing through the radio links, based on at least one of a change in the first communication quality in each of the plurality of radio links and a change in a state of traffic flowing through the plurality of radio links.

Advantageous Effects of Invention

The use of the present invention provides a path control device and a path control method which are capable of adaptively coping with changes in a network, such as a change in traffic and a change in link quality.

DESCRIPTION OF EMBODIMENTS

First Exemplary Embodiment

Hereinafter, exemplary embodiments of the present invention will be described with reference to the drawings. A configuration example of a path control device according to a first exemplary embodiment of the present invention will be described with reference to FIG. 1. A path control device 10 includes a link information management unit 11, a traffic information management unit 12, and a path setting unit 13.

Figure 1:
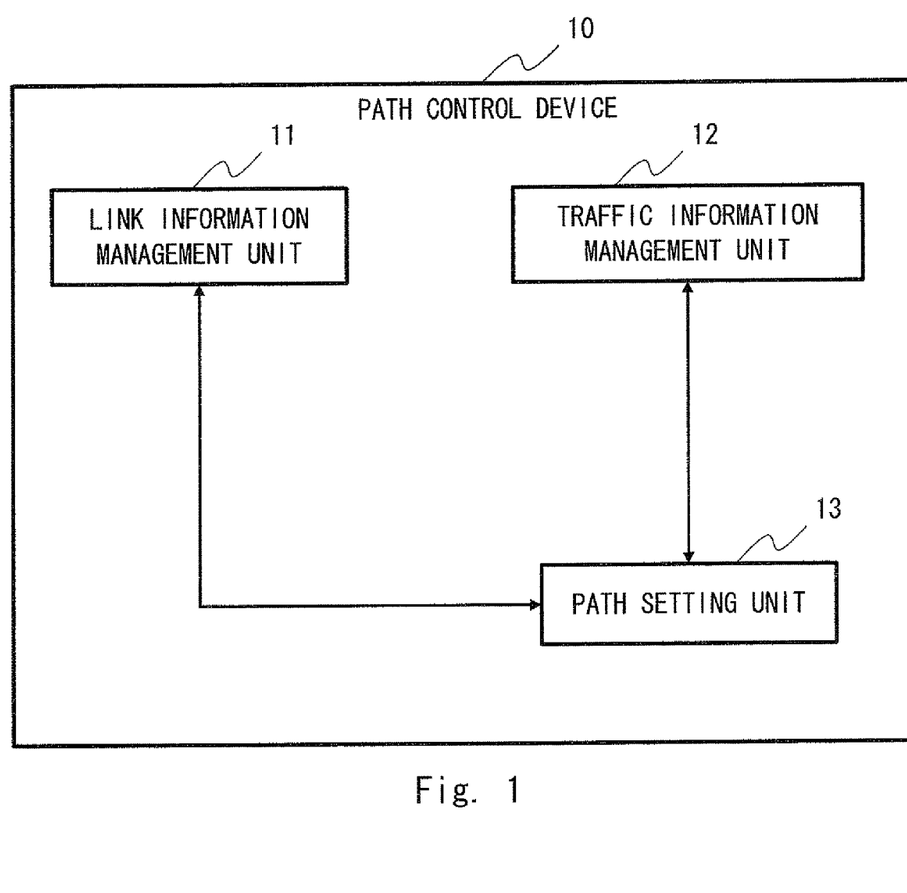
FIG. 1 is a block diagram of a path control device according to a first exemplary embodiment.

The path control device 10 sets a communication path using a plurality of radio links that connect a plurality of communication devices. Accordingly, the path control device 10 is connected to each communication device. The path control device 10 notifies each communication device of the set communication path.

The link information management unit 11 manages the communication quality of each of the plurality of radio links. The communication quality varies due to a change in weather conditions or the like. Accordingly, the link information management unit 11 acquires the communication quality of each radio link through each communication device to which the radio link is set. The link information management unit 11 outputs the communication quality of each of the managed radio links to the path setting unit 13.

The traffic information management unit 12 manages the state of traffic flowing through each radio link. Each communication device transmits and receives data via radio links. The amount of data to be transmitted and received via radio links varies due to an increase or decrease in the number of flows to be set by the communication devices, or the like. For example, the traffic information management unit 12 acquires, from the communication devices, information on the increase or decrease in the number of flows to be set to the communication devices. Alternatively, the traffic information management unit 12 may acquire information on the increase or decrease in the number of flows to be set to the communication devices, from the path setting unit 13 that controls the addition or deletion of flows. The traffic information management unit 12 outputs, to the path setting unit 13, the managed information on the state of traffic flowing through each radio link.

The path setting unit 13 sets the path of each flow such that the communication quality of each radio link satisfies the communication quality required by the flow flowing through each radio link, based on at least one of a change in the communication quality output from the link information management unit 11 and a change in the traffic state output from the traffic information management unit 12. The flows flowing through the respective communication devices require a predetermined communication quality. The flows require different communication qualities. Upon detecting a change in the communication quality of the radio link to which the flow is set, or a change in the traffic state, or upon detecting a change in the communication quality of the radio link to which the flow is set, and a change in the traffic state, the path setting unit 13 sets the path of the flow so as to satisfy the communication quality required by the flow already set. Alternatively, the path setting unit 13 sets the path of the flow so as to satisfy the communication quality of the flow to be newly set.

As described above, the use of the path control device 10 according to the first exemplary embodiment of the present invention enables adaptive control of the path of each flow even when a change in the communication quality of each radio link or a change in traffic state occurs.

Figure 2:
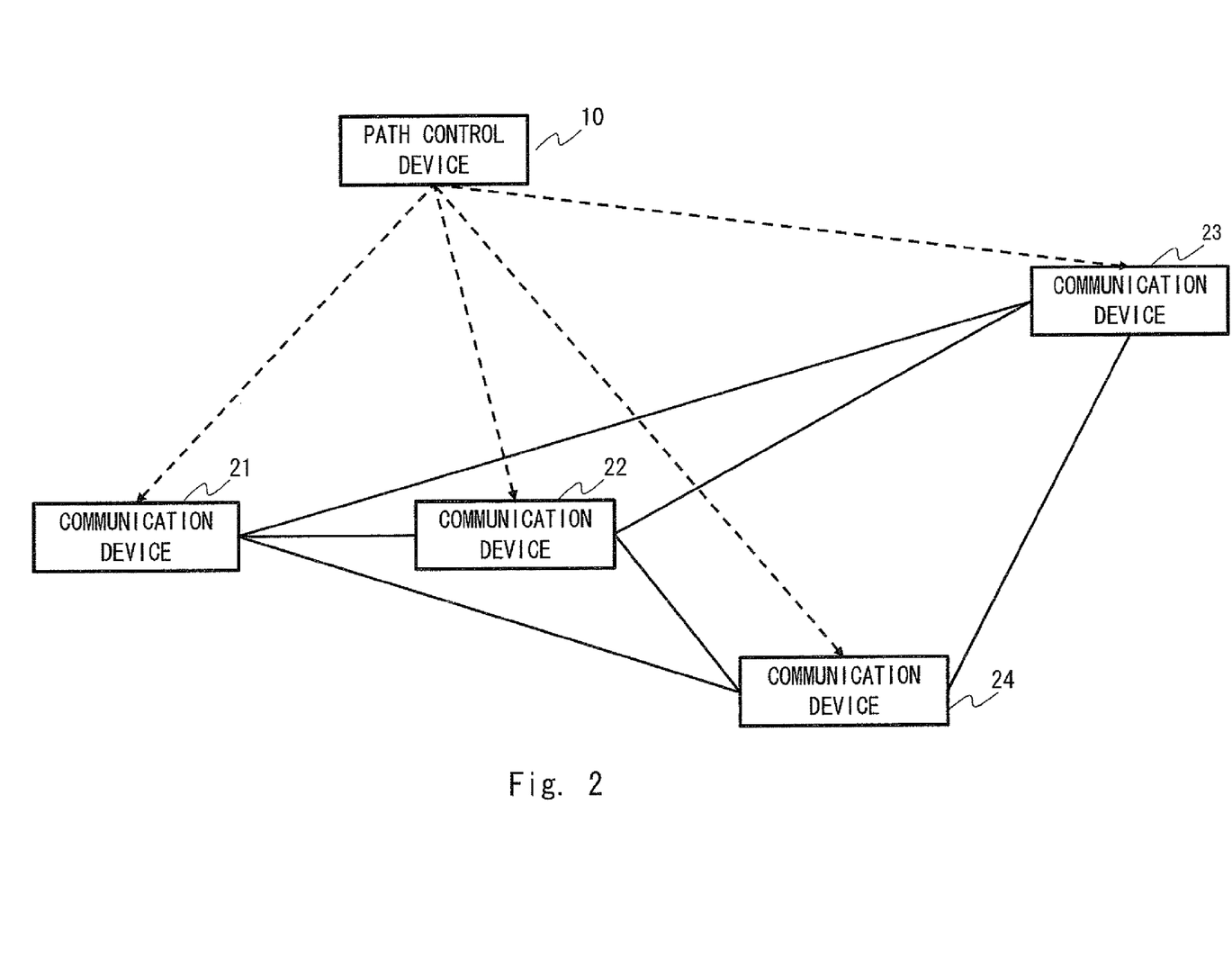
FIG. 2 is a block diagram of a network according to the first exemplary embodiment.

Referring next to FIG. 2, a network configuration example according to the first exemplary embodiment of the present invention will be described. Communication devices 21 to 24 transmit and receive data to and from other communication devices via radio links. In the network configuration shown in FIG. 2, the communication devices 21 to 24 are connected in a full-mesh manner. However, for example, a configuration in which some communication devices are not connected, such as a configuration in which the communication devices 21 and 22 are not connected, may be employed. A configuration in which radio links are disposed in some sections and wired cables are disposed in other sections may also be employed.

The path control device 10 is connected to each of the communication devices 21 to 24. Radio links or wired cables may be used to connect the path control device 10 to each of the communication devices 21 to 24. The path control device 10 manages the entire network and executes reception or termination of a new flow. The path control device 10 periodically acquires information on the communication quality of each radio link from the communication devices 21 to 24. The communication quality includes a bit error rate, a modulation method in use, or the like.

The communication devices 21 to 24 transmit data by using an adaptive modulation technique for adaptively selecting a modulation method depending on the communication quality of each radio link. As the modulation method to be selected, QPSK, 16 QAM, 32 QAM, 64 QAM, and the like are used. The communication quality of each radio link varies depending on an SNR received by the communication devices 21 to 24.

Figure 3:
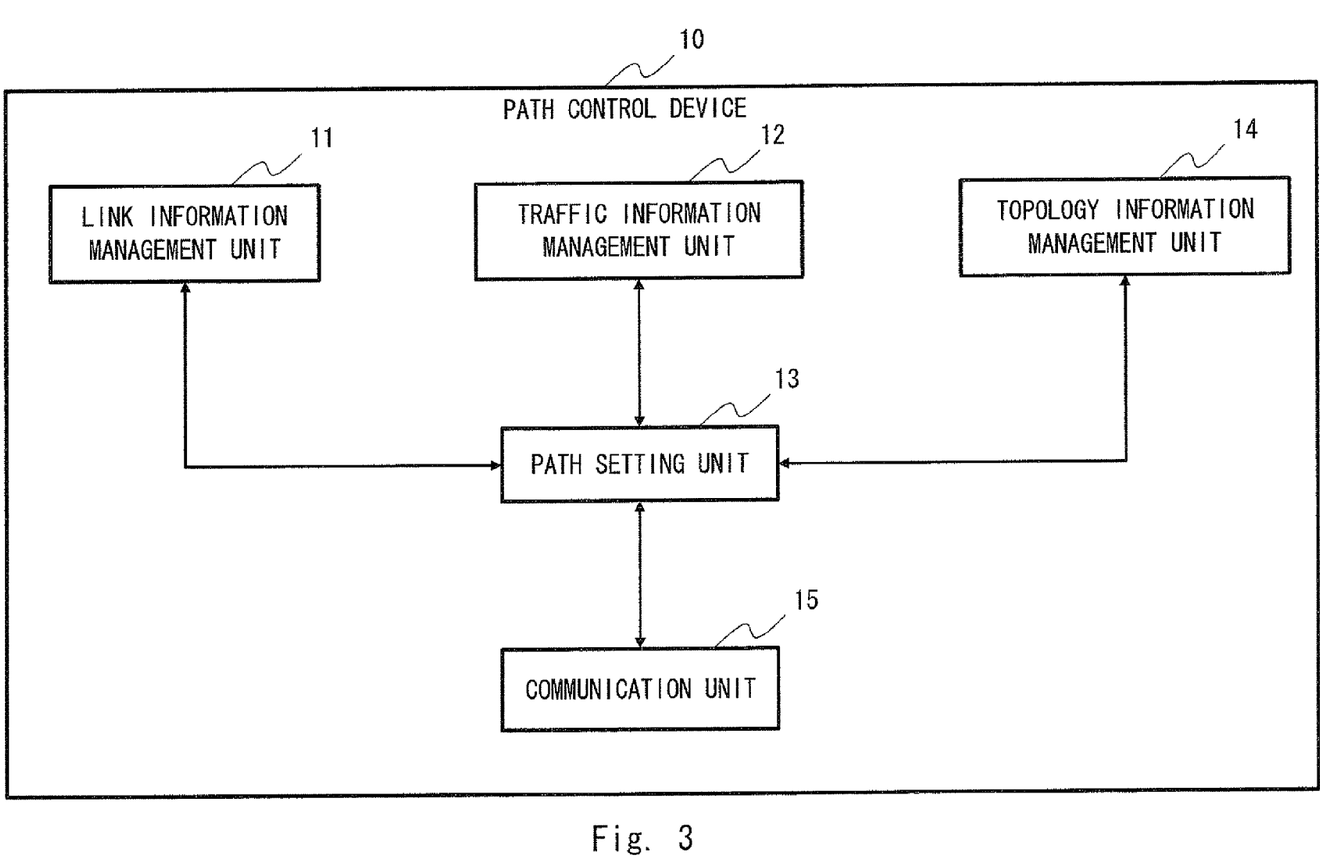
FIG. 3 is a block diagram of the path control device according to the first exemplary embodiment.

Subsequently, a detailed configuration example of the path control device 10 according to the first exemplary embodiment of the present invention will be described with reference to FIG. 3. The path control device 10 includes the link information management unit 11, the traffic information management unit 12, the path setting unit 13, a topology information management unit 14, and a communication unit 15. The link information management unit 11, the traffic information management unit 12, and the path setting unit 13 are similar to those shown in FIG. 1, and thus are denoted by the same reference numerals.

The link information management unit 11 manages the information on the radio links provided between the communication devices 21 to 24. The information on each radio link indicates a bit error rate of a flow flowing through each link, a modulation method in use, the stability of each modulation method, and the like. The stability for each modulation method will now be described.

The stability is an index indicating a probability that each modulation method can be used. Specifically, the stability indicates how stably the bandwidth of each link, which varies depending on the adaptive modulation, can be used. A method for calculating the stability will be described in detail.

Assume that the modulation modes usable by a certain radio link are QPSK, 16 QAM, 32 QAM, and 64 QAM. Also assume that, during an interval of four hours in the past, the radio link used the modulation mode 64 QAM for two hours, the modulation mode 32 QAM for one hour, and the modulation mode 16 QAM for one hour. In this case, proportions of the interval occupied by the respective modulation modes are expressed as 64 QAM=½, 32 QAM=¼, 16 QAM=¼, and QPSK=0. Here, if the stability of each modulation mode is a proportion occupied by modulation modes equal to or higher than the modulation mode, the respective stabilities are expressed as 64 QAM=½, 32 QAM=¾, 16 QAM=1, and QPSK=1.

The stability may also be calculated in the following manner. Assume that, during an interval of one hour in the past, a certain radio link used the modulation mode 64 QAM for 30 minutes, the modulation mode 32 QAM for 15 minutes, the modulation mode 16 QAM for 10 minutes, and the modulation mode QPSK for five minutes. Further, in the case of using the respective modulation modes, the period of time exceeding a predetermined bit error rate (BER) was 15 minutes in 64 QAM, five minutes in 32 QAM, two minutes in 16 QAM, and 0 minutes in QPSK. In this case, the stabilities in the respective modulation modes are expressed as 64 QAM=(30−15)/30=½, 32 QAM=(15−5)/15=⅔, 16 QAM=(10−2)/10=⅘, and QPSK=(5−0)/5=1. The link information management unit 11 periodically updates the information on each radio link.

When the stability is calculated in the manner as described above, a flow that requires a high stability (communication quality) can perform communication using 16 QAM or QPSK with a higher stability. A flow that requires only a low stability, such as best effort traffic, can perform communication using 64 QAM that places an emphasis on the bandwidth use efficiency.

Next, the traffic information management unit 12 manages the information on the flow flowing through the network. For example, the information on the flow includes information indicating a bandwidth to be used for each flow in a certain radio link, and information indicating the amount and location of traffic flowing through the radio link.

The topology information management unit 14 manages topology information of the network. For example, the topology information includes information on the connection relationship among the communication devices.

The path setting unit 13 sets a path of each flow by using the information output from each of the link information management unit 11, the traffic information management unit 12, and the topology information management unit 14. Each communication device is notified of the path of the flow, which is determined by the path setting unit 13, via the communication unit 15.

A path setting operation of the path setting unit 13 in a network configuration shown in FIG. 4 will now be described. The network configuration shown in FIG. 4 includes the path control device 10 and communication devices 31 to 33. A radio link that connects the communication device 31 and the communication device 32 is defined as a radio link 41. A radio link that connects the communication device 31 and communication device 33 is defined as a radio link 42. A radio link that connects the communication device 32 and the communication device 33 is defined as a radio link 43.

Figure 5:
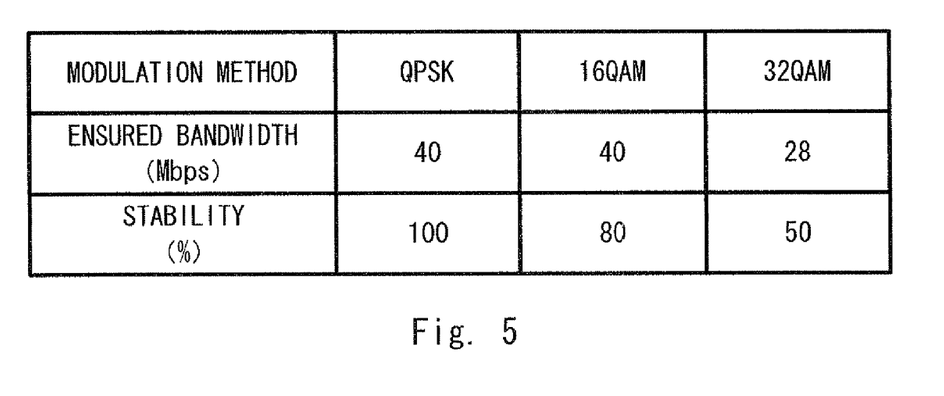
FIG. 5 is a table showing an ensured bandwidth and stability of each modulation method according to the first exemplary embodiment.

FIG. 5 shows the stability of each modulation method in the radio links 41 to 43 and the bandwidth ensured by each modulation method. For example, when the modulation method is QPSK, a bandwidth of 40 Mbps can be ensured and the stability is 100%. When the modulation method is 16 QAM, a bandwidth of 40 Mbps can be further ensured, as compared with QPSK. In other words, when the modulation method is 16 QAM, a bandwidth of 80 Mbps in total can be ensured. Specifically, a bandwidth up to 40 Mbps can be ensured using QPSK or 16 QAM, but it is necessary to use 16 QAM to ensure a bandwidth in the range from 41 Mbps to 80 Mbps. When the modulation method is 16 QAM, the stability is 80%. When the modulation method is 32 QAM, a bandwidth of 28 Mbps can be further ensured, as compared with 16 QAM. In other words, a bandwidth of 108 Mbps in total can be ensured. When the modulation method is 32 QAM, the stability is 50%.

Figure 4:
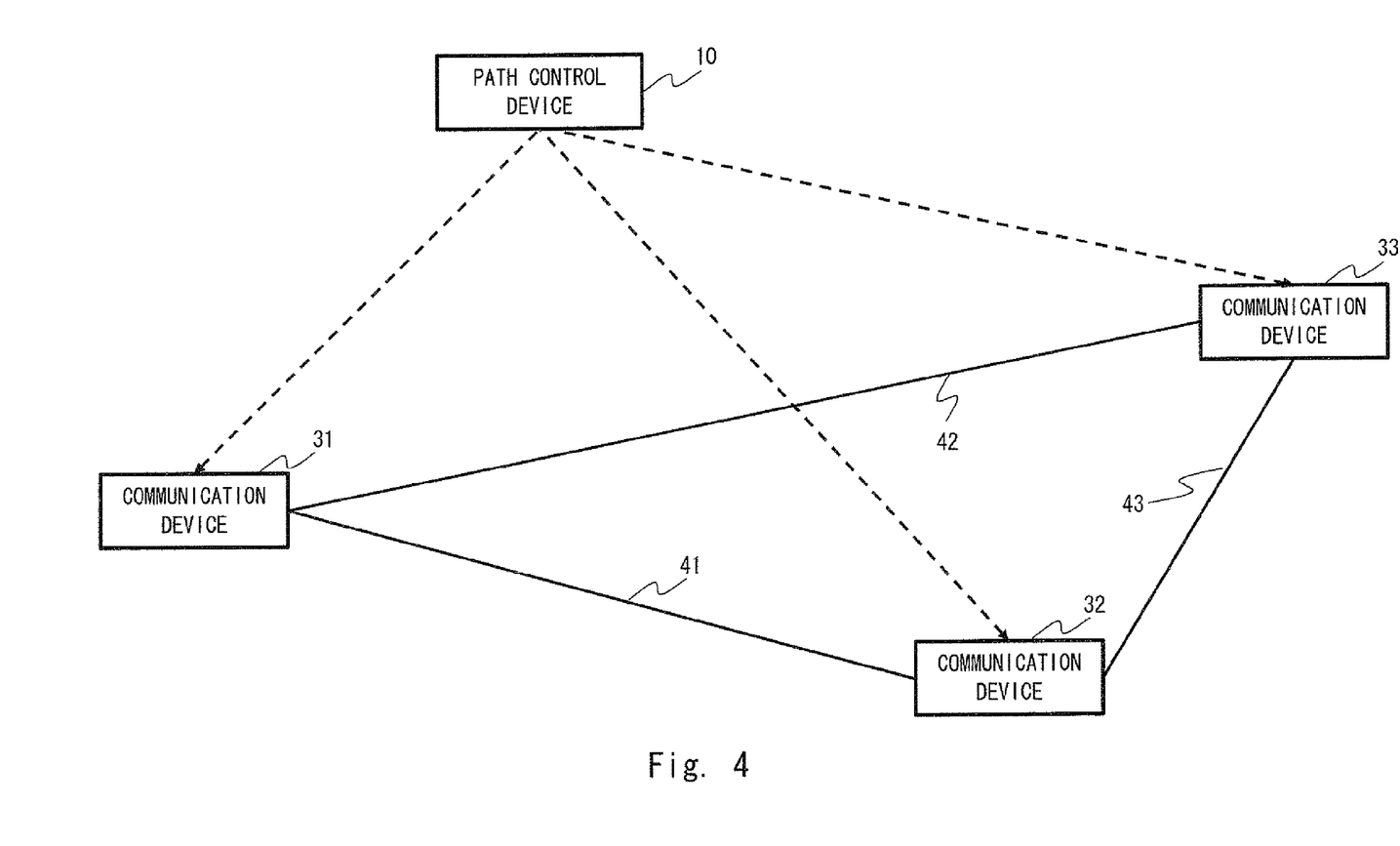
FIG. 4 is a block diagram of a network according to the first exemplary embodiment.

Assume herein that the following flows are flowing through the network shown in FIG. 4.

(1) Flow A of 30 Mbps that requires a communication quality (or stability, which holds true for the following description) of 95% is flowing between the communication device 31 and the communication device 33 by using 30 Mbps out of 40 Mbps which can be ensured by QPSK in the radio links 41 and 43. In this case, the communication quality of the path set to the radio links 41 and 43 is expressed as 1.0×1.0=100% by using the stability.

Next, (2) Flow B of 30 Mbps that requires a communication quality of 90% is flowing between the communication devices 31 and 33 by using, as a normal path, 30 Mbps out of 40 Mbps which can be ensured by 16 QAM in the radio link 42, and by using, as a redundant path, 30 Mbps out of the bandwidth which can be ensured by 16 QAM also in the radio links 41 and 32. In this case, the communication quality of the entire path is expressed as 1.0−(1.0−0.8)×(1−0.8×0.8)=92.8% by using the stability.

Next, (3) Flow C of 20 Mbps that requires a communication quality of 100% is flowing between the communication device 31 and the communication device 33 by using the bandwidth which can be ensured by QPSK in the radio link 42. In this case, the communication quality of the path set to the radio link 42 is expressed as 100%.

A description is given of an operation in the case where the bandwidth stability has been improved due to an improvement in the quality of each radio link in the state where the above-mentioned Flows A to C are flowing. For example, assume that the communication quality of the radio link 42 has been improved and the stability of the bandwidth which can be ensured by 16 QAM is 90%. The communication quality of each radio link varies depending on weather conditions, for example. At this time, the path control device 10 extracts, from the flows using the radio link 42, a flow that requires no redundant path after the stability has been improved. Here, when Flow B uses 30 Mbps out of 40 Mbps which can be ensured by 16 QAM in the radio link 42, the communication quality of 90% required by Flow B is satisfied. Accordingly, the path setting unit 13 can delete the radio links 41 and 43 serving as redundant paths set to Flow B.

Next, a description is given of an operation in the case where the stability of the bandwidth has been lowered due to deterioration in the quality of each radio link in the state where the above-mentioned Flows A and C are flowing. For example, assume that the communication quality of the radio link 41 has deteriorated and the stability of the bandwidth which can be ensured by QPSK is 90%. In this case, the communication quality of the path using the bandwidth which can be ensured by QPSK in the radio links 41 and 43 is expressed as 0.9×1.0=90%, with the result that the communication quality required by Flow A is not satisfied. Accordingly, the path setting unit 13 newly sets a redundant path using a bandwidth of 30 Mbps, which can be ensured by 16 QAM in the radio link 42, as a redundant path in Flow A. Thus, the communication quality of the entire path of Flow A is expressed as 1−(1−0.9×1.0)×(1−0.8)=98%. The path that satisfies the requirement of the communication quality of Flow A can be maintained by providing the redundant path to Flow A.

Figure 6:
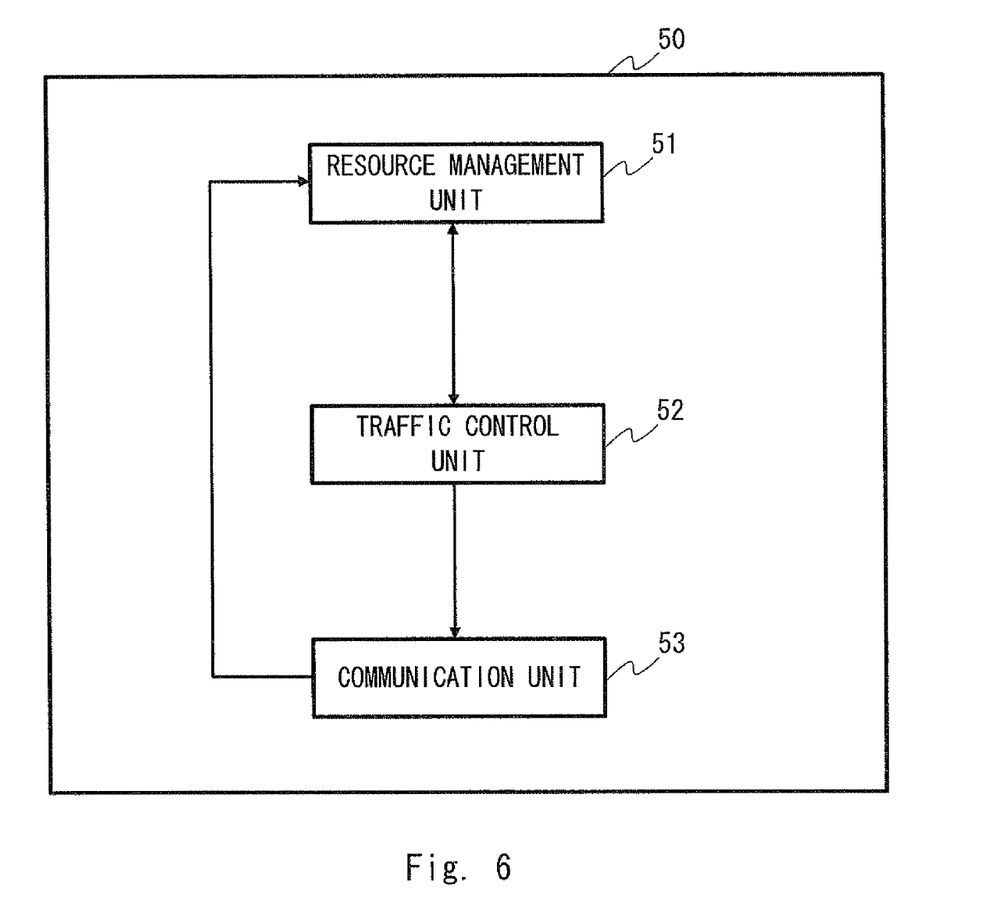
FIG. 6 is a block diagram of a communication device according to the first exemplary embodiment.

Subsequently, a configuration example of the communication devices according to the first exemplary embodiment of the present invention will be described with reference to FIG. 6. A communication device 50 is identical with each of the communication devices 21 to 24 shown in FIG. 2 and each of the communication devices 31 to 33 shown in FIG. 4. The communication device 50 includes a resource management unit 51, a traffic control unit 52, and a communication unit 53.

The resource management unit 51 manages information on each flow. The information on each flow indicates an allocated bandwidth of a flow using a radio link, a forwarding destination of a flow, and the like. The resource management unit 51 stores resource allocation information notified from the path control device 10. The traffic control unit 52 controls traffic based on the information stored in the resource management unit 51, and outputs data from the communication unit 53. The resource management unit 51 monitors the communication unit 53, and notifies the path control device 10 of the information upon detecting a change in the link quality of each radio link.

Figure 7:
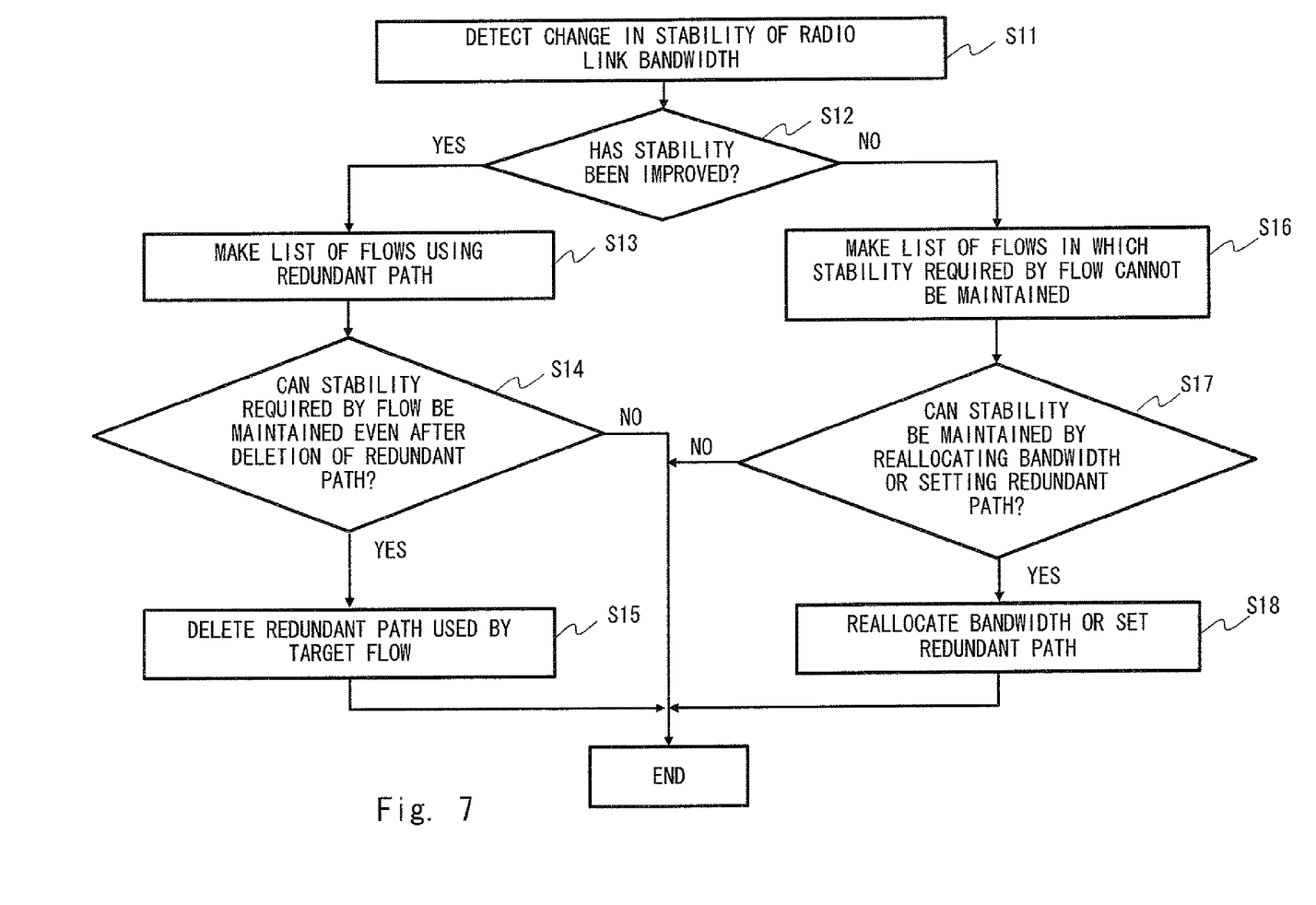
FIG. 7 is a flowchart showing a flow of a flow setting process according to the first exemplary embodiment.

Subsequently, a flow of a flow setting process according to the first exemplary embodiment of the present invention will be described with reference to FIG. 7. First, the path setting unit 13 receives a notification of a change in the radio link quality from the link information management unit 11 that manages the quality information of the radio links (S11). Specifically, the path setting unit 13 receives a notification as to a change of the stability in each bandwidth of the radio links from the link information management unit 11.

Next, the path setting unit 13 determines whether the stability of each bandwidth of the radio links has been improved or not (S12). When determining that the stability has been improved, the path setting unit 13 extracts a flow using a redundant path, from a list of flows managed by the traffic information management unit 12 (S13).

Next, the path setting unit 13 determines whether there is a flow which requires no redundant path because the communication quality required by the flow is satisfied (S14). When there is no flow that requires no redundant path, the path setting unit 13 terminates the process. When there is a flow that requires no redundant path, the path setting unit 13 notifies the communication device of deletion of the redundant path in the flow (S15). In this case, the deleted redundant path may be used for traffic, such as best effort traffic, which has a priority lower than that of the flow requiring no redundant path, so as to reuse the redundant path when the bandwidth stability deteriorates. Thus, the deleted redundant path can be preferentially used by the flow as needed.

In step S12, when determining that the stability has deteriorated, the path setting unit 13 extracts a flow in which the communication quality required by the flow cannot be maintained, from the list of flows managed by the traffic information management unit 12 (S16). With regard to the extracted flow, the path setting unit 13 determines whether the communication quality required by the flow can be maintained or not by changing the allocated bandwidth or setting a redundant path (S17). When determining that the communication quality required by the flow cannot be maintained even by changing the allocated bandwidth or setting a redundant path, the path setting unit 13 terminates the process. When determining that the communication quality required by the flow can be maintained by changing the allocated bandwidth or setting a redundant path, the path setting unit 13 notifies the communication device of reallocation of a bandwidth or setting of a redundant path (S18).

As described above, the use of the path control device according to the first exemplary embodiment of the present invention enables reconfiguration of an optimum path of a flow depending on a change in the communication quality of each radio link. If the stability has deteriorated, the communication quality of a flow can be maintained by changing the allocated bandwidth or setting a redundant path, even when the stability has deteriorated after path setting.

Further, if the stability has been improved, the redundant path is deleted in the case where the communication quality required by the flow is satisfied even when the redundant path is deleted from the flow to which the redundant path is set. An available bandwidth obtained by deleting the redundant path can be used by other best effort traffic, which results in an improvement in the use efficiency of the network.

Second Exemplary Embodiment

Subsequently, a flow setting operation according to a second exemplary embodiment of the present invention will be described. The second exemplary embodiment of the present invention illustrates an operation of deleting a redundant path of an existing flow by using an available bandwidth obtained upon completion of the existing flow. Note that the second exemplary embodiment of the present invention is described with reference to FIG. 4 showing a network configuration and FIG. 5 showing the stability and the ensured bandwidth of each modulation method in the radio links 41 to 43.

Assume herein that the following flows are flowing through the network shown in FIG. 4.

(1) Flow D of 30 Mbps that requires a communication quality of 95% is flowing between the communication device 31 and the communication device 33 by using 30 Mbps out of 40 Mbps which can be ensured by QPSK in each of the radio links 41 and 43. In this case, the communication quality of the path set to the radio links 41 and 43 is expressed as 1.0×1.0=100% by using the stability.

Next, (2) Flow E of 40 Mbps that requires a communication quality of 95% is flowing between the communication device 31 and the communication device 33 by using the entire bandwidth of 40 Mbps which can be ensured by QPSK in the radio link 42. In this case, the communication quality of the path set to the radio link 42 is expressed as 100%.

Next, (3) Flow F of 30 Mbps that requires a communication quality of 90% is flowing between the communication devices 31 and 33 by using, as a normal path, 30 Mbps out of the bandwidth which can be ensured by 16 QAM in the radio link 42, and by using, as a redundant path, 30 Mbps out of the bandwidth which can be ensured by 16 QAM in each of the radio links 41 and 32. In this case, the communication quality of the entire path is expressed as 1.04·1.0−0.8)×(1−0.8×0.8)=92.8%.

A description is given of an operation in the case where Flow E is completed and the bandwidth of 40 Mbps which is ensured by QPSK in the radio link 42 used by Flow E is released in the state where the above-mentioned Flows D to F are flowing. In this case, the path control device 10 checks whether there is another flow which uses the radio link 42 and which requires no redundant path after allocation of the released bandwidth.

Here, the path control device 10 reallocates the bandwidth of 30 Mbps, which is ensured by QPSK, to Flow F used by the radio link 42. In this case, since the stability of the bandwidth ensured by QPSK is 100%, Flow F can ensure a path having a communication quality of 90% or more as a redundant path. Accordingly, the path control device 10 notifies the communication devices 31 and 33 of a change in the allocated bandwidth of Flow F, and notifies the communication devices 31 to 33 of deletion of the redundant path of Flow F. This enables allocation of the bandwidth, which is ensured by 16 QAM and used as the redundant path of Flow F in each of the radio links 41 and 43, to a new flow.

Figure 8:
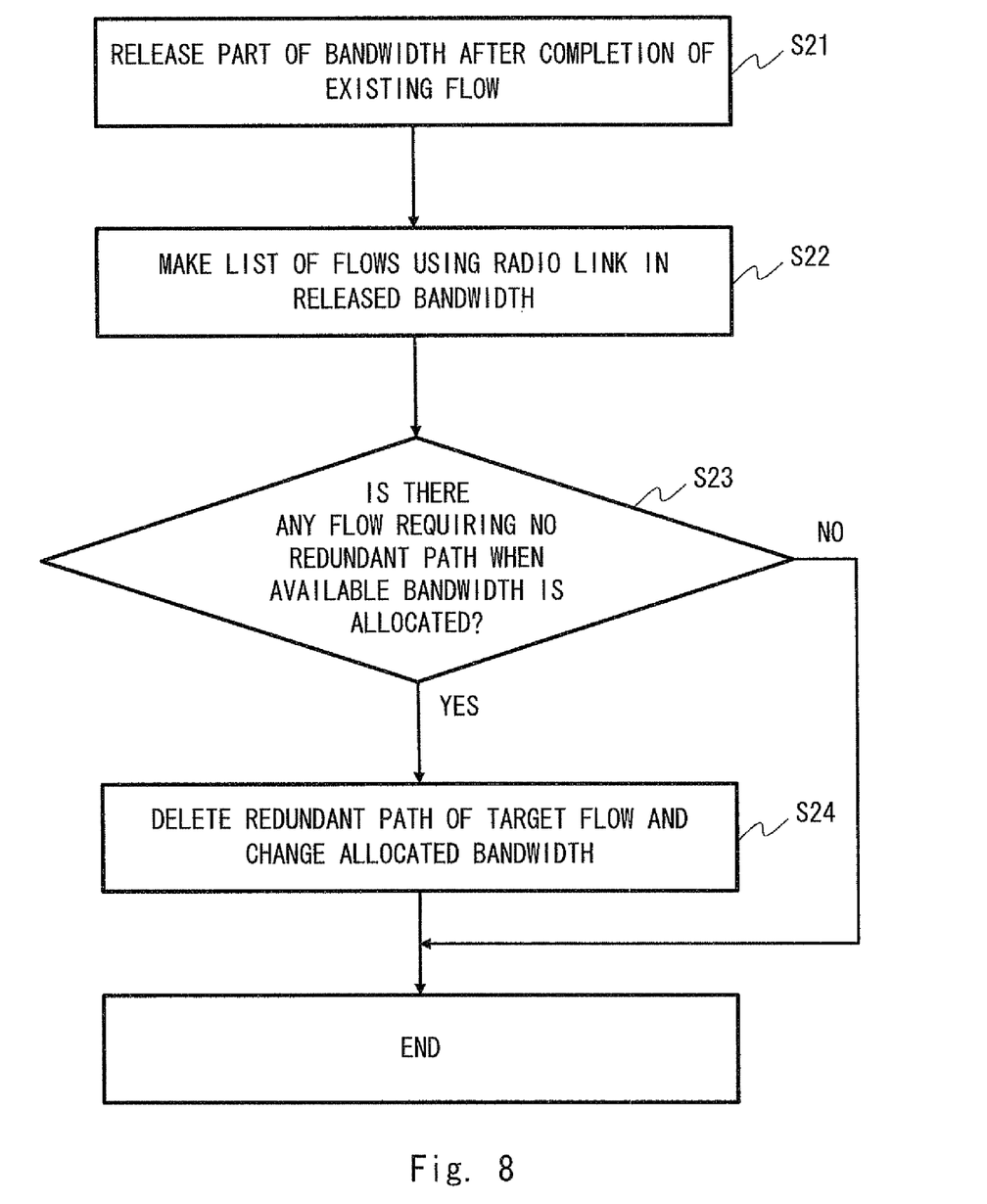
FIG. 8 is a flowchart showing a flow of a flow setting process according to a second exemplary embodiment.

Subsequently, a flow of a flow setting process according to the second exemplary embodiment of the present invention will be described with reference to FIG. 8. First, the path setting unit 13 receives a notification of completion of an existing flow from the communication device (S21). The path setting unit 13 acquires, from the traffic information management unit 12, information on the bandwidth released upon completion of the existing flow. Further, the path setting unit 13 extracts, from the link information management unit 11, a flow using the radio link in the released bandwidth (S22).

Next, with regard to the extracted flow, the path setting unit 13 determines whether the redundant path can be deleted or not by allocating the available bandwidth (S23). When there is no flow from which the redundant path cannot be deleted, the path setting unit 13 terminates the process. When determining that there is a flow from which the redundant path can be deleted, the path setting unit 13 notifies the communication device of a change in the allocated bandwidth for the flow and deletion of the redundant path (S24). The path setting unit 13 updates the information of each of the link information management unit 11 and the traffic information management unit 12.

As described above, the use of the path control device according to the second exemplary embodiment of the present invention enables reconfiguration of an optimum path of a flow depending on a change in the traffic state of each radio link. When the redundant path can be deleted by using an available bandwidth obtained after completion of a flow, the bandwidth used by the redundant path can be used for best effort traffic, which results in a further improvement in the use efficiency of the network.

Third Exemplary Embodiment

Subsequently, a flow setting operation according to a third exemplary embodiment of the present invention will be described. The third exemplary embodiment of the present invention illustrates an operation carried out when it is necessary to accommodate a new flow of high priority. Note that the second exemplary embodiment of the present invention is described with reference to FIG. 4 showing a network configuration and FIG. 5 showing the stability and the ensured bandwidth of each modulation method in the radio links 41 to 43.

Assume herein that the following flows are flowing through the network shown in FIG. 4.

(1) Flow G of 30 Mbps that requires a communication quality of 95% is flowing between the communication device 31 and and the communication device 33 by using 30 Mbps out of 40 Mbps which can be ensured by QPSK in each of the radio links 41 and 43. In this case, the communication quality of the path set to the radio links 41 and 43 is expressed as $1.0 \times 1.0 = 100\%$ by using the stability.

Next, (2) Flow H of 30 Mbps that requires a communication quality of 90% is flowing between the communication device 31 and the communication device 33 by using 30 Mbps out of 40 Mbps which can be ensured by QPSK in the radio link 42. In this case, the communication quality of the path set to the radio link 42 is expressed as 100%.

Assume herein that Flow I of 20 Mbps which has a priority higher than that of Flows G and H and which requires a communication quality of 100% occurs between the communication device 31 and the communication device 33. The bandwidth having a stability of 100% is used by each of Flows G and H. Thus, Flow I cannot be accommodated as it is.

Accordingly, it is determined whether it is possible to reallocate Flow H to the bandwidth, which can be ensured by 16 QAM, from the bandwidth, which can be ensured by QPSK, while satisfying the quality required by Flow H. When Flow H is reallocated to the bandwidth which can be ensured by 16 QAM, the communication quality required by Flow H cannot be satisfied. However, when a new redundant path is used for Flow H by using the bandwidth which can be ensured by 16 QAM in each of the radio links 41 and 43, the communication quality of the entire path of Flow H is expressed as $(1-(1-0.8) \times (1-0.8 \times 0.8)) = 92.8\%$. Thus, the communication quality required by Flow H can be satisfied.

Accordingly, the path control device 10 changes the allocated bandwidth and sets a redundant path for Flow H, thereby releasing the bandwidth which can be ensured by QPSK in the radio link 42. Then, a path using a bandwidth, which can be ensured by QPSK in the radio link 42 and has a stability of 100%, is set as the path of Flow I. Thus, the network can newly accommodate Flow I, while maintaining the communication quality of Flow H at a certain level or higher.

Figure 9:
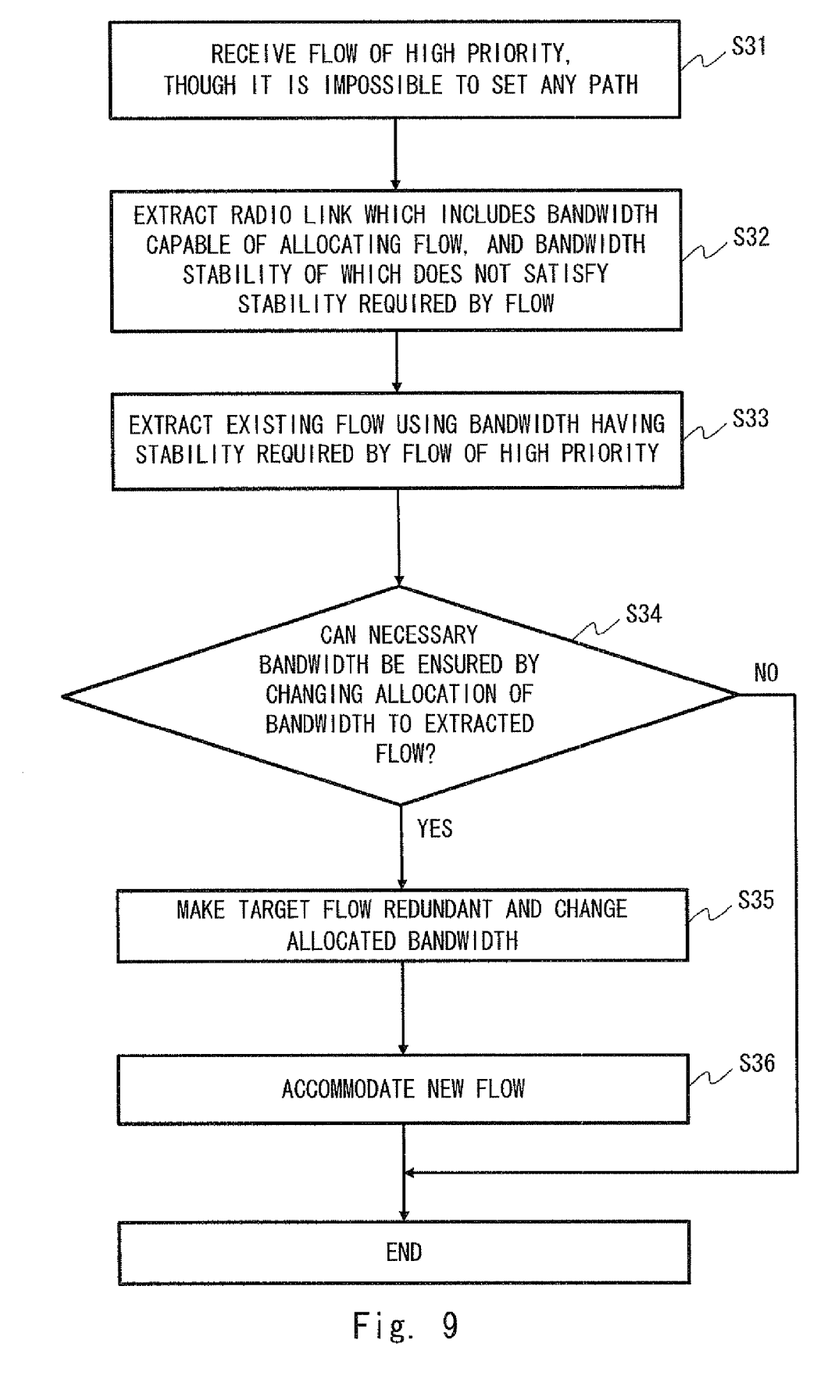
FIG. 9 is a flowchart showing a flow of a flow setting process according to a third exemplary embodiment.

Referring next to FIG. 9, a flow of a flow setting process according to the third exemplary embodiment of the present invention will be described. First, the path setting unit 13 receives a flow of high priority, but determines that it is impossible to set any path because there is no available bandwidth (S31). Next, the path setting unit 13 extracts a radio link which includes a bandwidth capable of allocating the flow of high priority, and the bandwidth stability of which does not satisfy the stability required by the flow of high priority (S32).

Next, in the extracted radio link, the path setting unit 13 extracts, from the link information management unit 11, an existing flow using a bandwidth having the stability required by the flow of high priority (S33). Then, the path setting unit 13 acquires flow information from the link information management unit 11 and topology information from the topology information management unit 14, and determines whether it is possible to set a path for the existing flow to a bandwidth having a low stability by setting a redundant path, for example. (S34). When determining that it is impossible to set a path for the existing flow to a bandwidth having a low stability, the path setting unit 13 terminates the process. When determining that it is possible to set a path for the existing flow to a bandwidth having a low stability, the path setting unit 13 sets a path for a new flow of high priority (S35), and accommodates the new flow (S36).

As described above, the use of the path control device according to the third exemplary embodiment of the present invention enables accommodation of a new flow of high priority, while maintaining the communication quality of the existing flow. Moreover, even when it is necessary to prepare a redundant path to satisfy the communication quality required by a flow newly added upon accommodation, the newly added flow can be accommodated without using any redundant path, by changing the allocation of the bandwidth to the existing flow.

Note that the present invention is not limited to exemplary embodiments described above, but can be modified as needed without departing from the scope of the invention.

The present invention has been described above with reference to exemplary embodiments, but the present invention is not limited to the embodiments described above. The configuration and details of the present invention can be modified in various manners which can be understood by those skilled in the art within the scope of the invention.

This application is based upon and claims the benefit of priority from Japanese patent application No. 2010-138392, filed on Jun. 17, 2010, the disclosure of which is incorporated herein in its entirety by reference.

INDUSTRIAL APPLICABILITY

The present invention is applicable to a path control device that sets a path using radio links.

REFERENCE SIGNS LIST

10 PATH CONTROL DEVICE
11 LINK INFORMATION MANAGEMENT UNIT
12 TRAFFIC INFORMATION MANAGEMENT UNIT
13 PATH SETTING UNIT
14 TOPOLOGY INFORMATION MANAGEMENT UNIT
15 COMMUNICATION UNIT
21-24 COMMUNICATION DEVICE
31-33 COMMUNICATION DEVICE
50 COMMUNICATION DEVICE
51 RESOURCE MANAGEMENT UNIT
52 TRAFFIC CONTROL UNIT
53 COMMUNICATION UNIT

The invention claimed is:

1. A path control device that sets a communication path using a plurality of radio links connecting a plurality of communication devices to each other, the path control device comprising:
a link information unit that manages a first communication quality of each of the plurality of radio links;
a traffic information management unit that manages a state of traffic flowing through the plurality of radio links; and
a path setting unit that sets the communication path of a flow such that the first communication quality of the communication path satisfies a second communication quality required by the flow flowing through the radio links, based on at least one of a change in the first communication quality and a change in the state of the traffic,
wherein the path setting unit further sets a redundant path when a normal path set to the flow does not satisfy a communication quality required by the flow.

2. The path control device according to claim 1, wherein the radio links use a plurality of modulation methods by adaptive modulation, and the first communication quality is determined for each of the modulation methods.

3. The path control device according to claim 2, wherein the communication quality includes a stability indicating a probability that each of the modulation methods can be used in the radio links capable of using adaptive modulation.

4. The path control device according to claim 3, wherein the stability is calculated based on at least one of a history of a modulation method used in the radio links and a history of information indicating a radio wave environment of the radio links.

5. The path control device according to claim 1, wherein the path setting unit allocates, to the flow, a bandwidth determined depending on a modulation method used for the flow.

6. The path control device according to claim 1, wherein
the path setting unit deletes the redundant path set to the flow, when the first communication quality of the normal path is improved and the second communication quality required by the flow to which the redundant path is set is satisfied by using only the normal path, and
the path setting unit sets the redundant path to the flow when the first communication quality of the normal path deteriorates and the second communication quality required by the flow to which only the normal path is set is not satisfied.

7. The path control device according to claim 1, wherein when a bandwidth allocated to the flow is released and the state of the traffic changes, the path setting unit extracts a flow satisfying the second communication quality even when a bandwidth allocated to the redundant path is released by allocating the released bandwidth, and deletes the redundant path of the extracted flow.

8. The path control device according to claim 1, wherein
upon setting of a path for a new flow, the path setting unit allocates a bandwidth of an existing flow having a priority lower than the priority of the new flow, and allocates, to the existing flow, a bandwidth having a communication quality lower than that of the bandwidth allocated to the new flow, and
in the allocated bandwidth, the path setting unit sets a redundant path to the existing flow when the second communication quality required by the existing flow is not satisfied.

9. The path control device according to claim 1, wherein, when the first communication quality of the normal path is improved or a bandwidth allocated to the flow is released, the path setting unit determines whether the redundant path can be deleted.

10. A path control method that sets a communication path using a plurality of radio links connecting a plurality of communication devices to each other, the path control method comprising:
setting the communication path of a flow such that a first communication quality of the communication path satisfies a second communication quality required by the flow flowing through the radio links, based on at least one of a change in the first communication quality in the plurality of radio links and a change in a state of traffic flowing through the plurality of radio links; and
setting a redundant path when a normal path set to the flow does not satisfy a communication quality required by the flow.

* * * * *